United States Patent [19]

Barnes

[11] Patent Number: 5,077,626
[45] Date of Patent: Dec. 31, 1991

[54] PHASE-FAILURE DETECTORS RESPONSIVE TO UNEQUAL BENDING OF BI-METAL MEMBERS

[75] Inventor: John Barnes, Wirral, United Kingdom

[73] Assignee: British Nuclear Fuels plc, Risley, England

[21] Appl. No.: 502,731

[22] Filed: Apr. 2, 1990

[30] Foreign Application Priority Data

Apr. 11, 1989 [GB] United Kingdom ............... 8908102

[51] Int. Cl.[5] .............................................. H02H 3/26
[52] U.S. Cl. ....................................... 361/85; 340/635; 250/229
[58] Field of Search ....................... 361/85, 87, 93, 94, 361/103, 105; 307/131; 337/44, 78, 79; 335/17; 340/635; 250/229

[56] References Cited

U.S. PATENT DOCUMENTS

| | | | |
|---|---|---|---|
| 3,949,219 | 4/1976 | Crouse | 250/229 |
| 4,379,968 | 4/1983 | Ely et al. | 250/229 |
| 4,475,098 | 10/1984 | Hoffmann et al. | 337/49 |
| 4,692,612 | 9/1987 | Havel | 250/229 |
| 4,723,190 | 2/1988 | Chung | 361/105 X |
| 4,831,253 | 5/1989 | Omura et al. | 250/229 |
| 4,979,069 | 12/1990 | Simpson | 361/31 |

Primary Examiner—William Shoop, Jr.
Assistant Examiner—A. Jonathan Wysocki
Attorney, Agent, or Firm—William R. Hinds

[57] ABSTRACT

Circuit breakers can be used to replace fuses in plant comprising centrifuge machines driven by small three-phase electric motors. The circuit breakers incorporate three bi-metal strips which bend due to the heat produced by current flow. Loss of current in one phase results in unequal bending of these trips. In one arrangement, a light-emitting diode 5 fitted to a first strip 2 produced light to pass through an aperture 8 in a plate 7 on the second strip 3 to fall on a photo-sensitive detector 6 on the third strip 4. Any unequal bending causes the light to be cut-off and the resulting signal can be used to trip the circuit breaker. In some cases the strips are the strips in the circuit breaker.

3 Claims, 3 Drawing Sheets

PHASE-FAILURE DETECTORS RESPONSIVE TO UNEQUAL BENDING OF BI-METAL MEMBERS

The present invention concerns phase-failure detectors for use with electrical circuit breakers.

Circuit breakers are employed to protect electrical equipment. An important requirement in circuits having a three-phase supply is the ability of the circuit breaker to trip in the event of failure in any of the three phases.

According to the present invention a phase-failure detector comprises three bi-metal strips, and means mounted on the strips for detecting unequal bending in the strips arising from loss of current in a phase and arranged to provide a signal. The detecting means comprises a light source and a light detector respectively mounted on two of the strips with an apertured plate situated between the source and the detector and mounted on the third strip.

The detector may be in combination with a circuit breaker, the signal being arranged to trip the circuit breaker.

The invention will be described further, by way of example, with reference to the accompanying drawings, in which.

Figure 1:
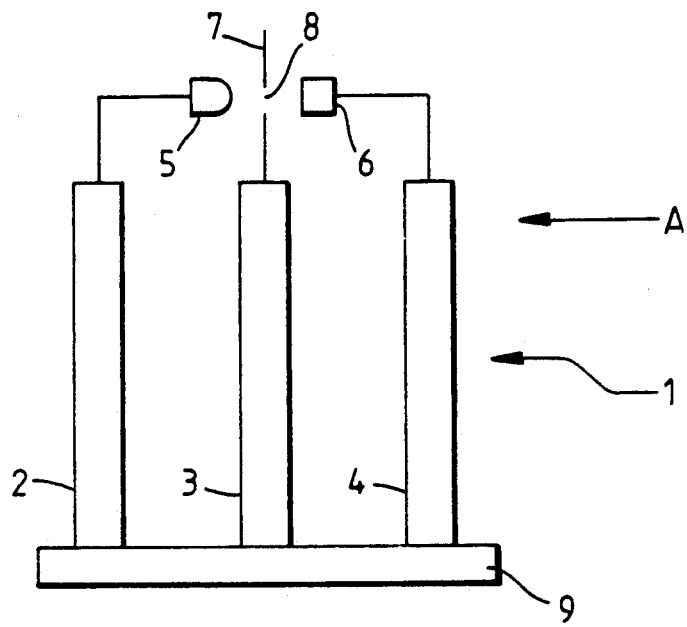
FIG. 1 is a diagrammatic representation of an embodiment of a phase-failure detector.

A circuit breaker incorporates three bi-metal strips which bend as a result of heat produced by electric current flowing through the strips. The circuit breaker, which can be used to protect electrical equipment such as a three-phase electric motor, is required to trip in the event of loss of current in any of the three phases. It becomes necessary to detect such loss of current to provide a signal to trip the circuit breaker.

With reference to the drawings, a phase-failure detector 1 comprises three co-planar flat bi-metal strips 2, 3 and 4 extending from a support 9. A light source, conveniently a light emitting diode 5, is mounted on the strip 2. A light sensitive detector, conveniently a photodiode 6, is mounted on the strip 4 and opposite the light emitting diode 5. A plate 7 having an aperture 8 therethrough is mounted on the central strip 3 such that normally light from the diode 5 can pass through the aperture 8 to fall on the detector 6.

Figure 2:
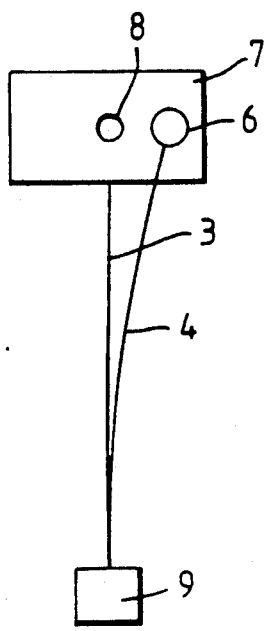
FIG. 2 is a view in direction of arrow A in FIG. 1 showing the detector in a fault condition.

The strips 2, 3 and 4 bend as a result of the heat produced by current flow therethrough. In normal operation with current flow in each strip, the strips bend transverse to the initial plane by substantially the same amount and in the same sense so that light from the source 5 can still pass through the aperture 8 in the central strip 3 to fall on the detector 6. In the event of unequal bending of the strips, such as would occur due to loss of current in one phase, the light source 5, detector 6 and aperture 8 in the plate 7 are no longer in alignment and can assume positions as depicted in FIG. 2 in which the strips 2, 4 are no longer in the same plane as the strip 3, the strip 3 receiving no heating. The light from the source 5 to the detector 6 is interrupted and the resulting loss or change in signal at the detector 6 can be used to trip the circuit breaker.

The strips 2, 3, 4 could be the strips in the circuit breaker.

Figure 3:
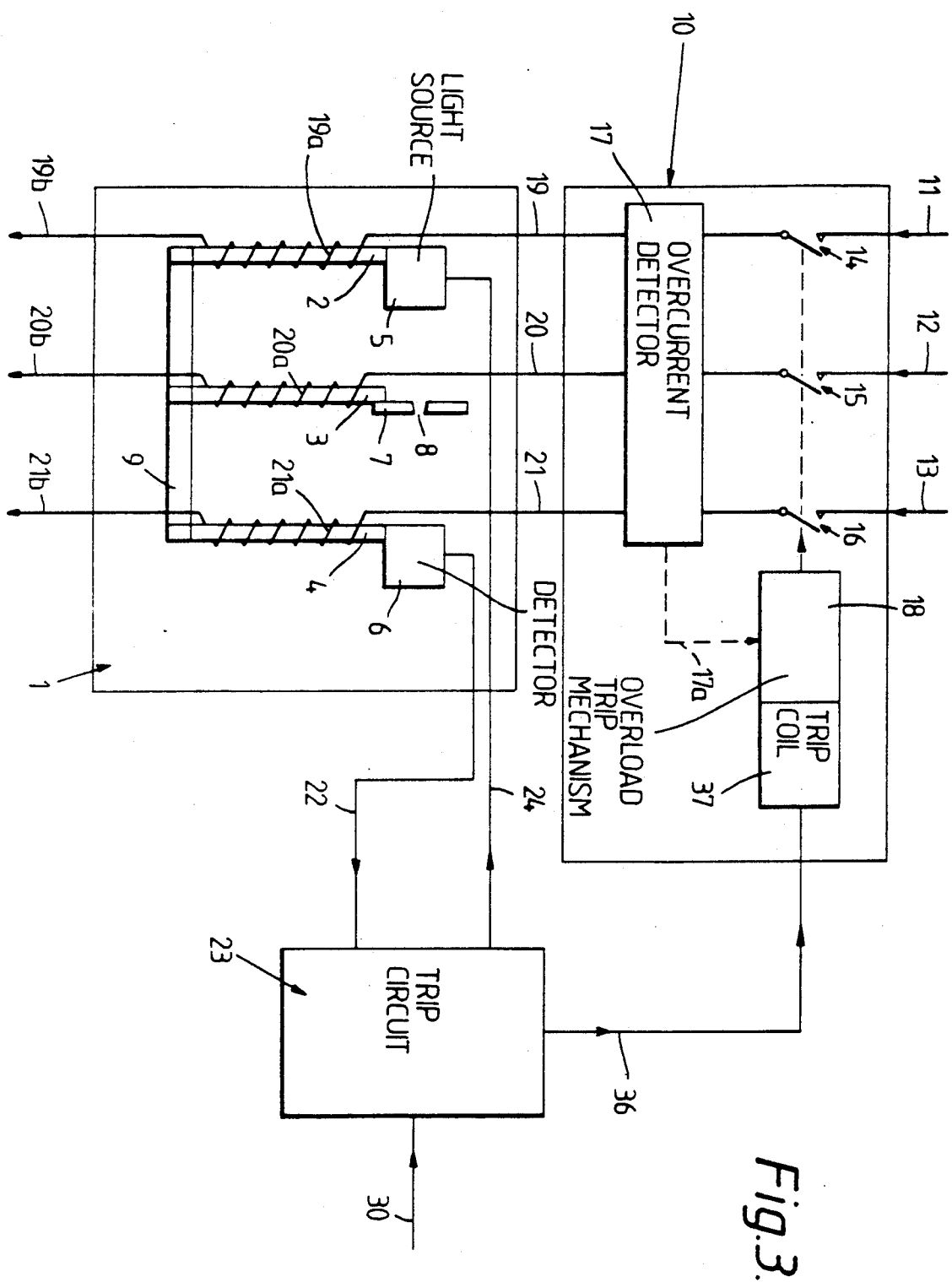
FIG. 3 shows another embodiment.
Figure 4:
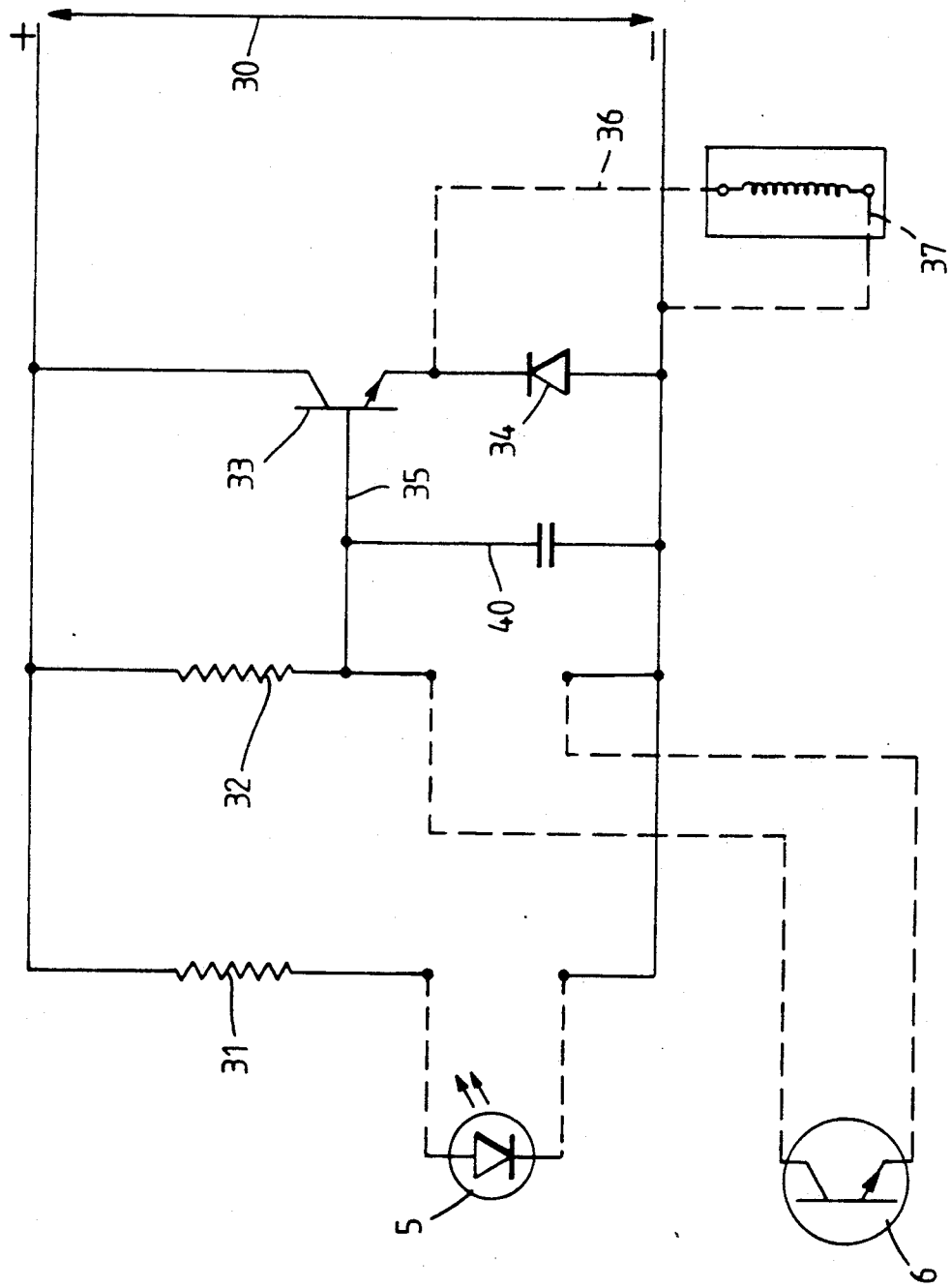
FIG. 4 shows a circuit.

FIGS. 3 and 4 illustrate another arrangement. A conventional circuit breaker 10 receives three-phase current from a supply on lines 11, 12, 13 including ganged switches 14, 15, 16 and connected to an overcurrent detector 17. This may include one or both of a thermal overcurrent detector responsive to continuing relatively small overload and a magnetic overcurrent detector responsive to an overload surge. The detector 17 is connected via line 17a to an overload trip mechanism 18 which opens switches 14, 15, 16 in response to a detected overload.

The three phase output from detector 17 goes on lines 19, 20, 21 to the phase-failure detector 1 and in this example the strips 2, 3, 4 are fitted with heating wires 19a, 20a, 21a. Alternatively the lines 19, 20, 21 could be connected directly to the strips 2, 3, 4. The lines 19, 20, 21 continue as lines 19b, 20b, 21b connected to a three-phase load.

An output signal leaves the detector 6 on line 22 to a trip circuit 23 (see FIG. 4) and the LED 5 is supplied from circuit 23 on line 24.

The trip circuit 23 may be as in FIG. 4 and receives a power supply at 30 (for example 12 VDC). The LED 5 is energised via resistor 31 to give an appropriate operating current. The device 6 (which may for example be a photo-transistor or a photo-diode or a light-dependent resistor) forms with resistor 32 a potential divider across the power supply 30.

A transistor 33 and diode 34 are connected across the supply 30.

When the light-sensitive device 6 is illuminated, its resistance is low and the resultant potential at the base 35 of the transistor 33 is low.

The transistor 33 is connected as an emitter-follower so that the output voltage on line 36 applied to a trip coil 37 in the circuit breaker 10 is low.

If the illumination of the device 6 is removed, i.e. if there is unequal bending of the strips 2 to 4, the resistance of the device 6 increases, causing an increase in the output voltage signal in line 36 causing the coil 37 to operate the trip mechanism 18, and open the switches 14 to 16.

A capacitor 40 may be included if desired to produce a delay before a trip occurs.

The diode 34 protects the device from any high back-end produced by the inductance of the trip coil 37.

The power supply 30 could be derived from the three-phase supply so that a separate supply would not be required and thus a self-contained system could be made only requiring to be connected in series with a load to be protected.

The arrangement could incorporate a trip device responsive to failure of the power supply.

The circuit 23 could include a "switch" to provide a high amplitude pulse of current to the trip coil 37 using energy stored in a capacitor, which may provide a reduction in power supply requirements especially in the case of a large number of trip devices operating together.

I claim:

1. A phase-failure detector comprising three bi-metal strips, and means mounted on the strips for detecting unequal bending in the strips arising from loss of current in a phase and arranged to provide a signal, in which the detecting means comprises a light source and a light detector respectively mounted on two of the strips, and an apertured plate between the source and the detector and mounted on the third strip.

2. A detector as claimed in claim 1, in electrical connection with a circuit breaker, the signal being operative to trip the circuit breaker.

3. A detector as claimed in claim 1, in electrical connection with a circuit breaker having a trip mechanism and, a trip detector circuit electrically connected to receive the signal and energise the trip mechanism.

* * * * *